(12) United States Patent
Harper, III et al.

(10) Patent No.: US 8,949,549 B2
(45) Date of Patent: Feb. 3, 2015

(54) MANAGEMENT OF OWNERSHIP CONTROL AND DATA MOVEMENT IN SHARED-MEMORY SYSTEMS

(75) Inventors: David T. Harper, III, Seattle, WA (US); Charles David Callahan, II, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 880 days.

(21) Appl. No.: 12/324,628

(22) Filed: Nov. 26, 2008

(65) Prior Publication Data

US 2010/0131720 A1 May 27, 2010

(51) Int. Cl.
| | |
|---|---|
| G06F 12/00 | (2006.01) |
| G06F 3/00 | (2006.01) |
| G06F 9/00 | (2006.01) |
| G06F 9/52 | (2006.01) |
| G06F 12/08 | (2006.01) |
| G06F 3/06 | (2006.01) |

(52) U.S. Cl.
CPC ............ G06F 9/526 (2013.01); G06F 12/0813 (2013.01); *G06F 3/067* (2013.01)
USPC ........................................................ 711/147

(58) Field of Classification Search
USPC ........................................................ 711/147
See application file for complete search history.

(56) References Cited

U.S. PATENT DOCUMENTS

| | | | |
|---|---|---|---|
| 4,136,386 A * | 1/1979 | Annunziata et al. .......... 711/119 |
| 5,095,424 A | 3/1992 | Woffinden et al. | |
| 5,586,331 A * | 12/1996 | Levenstein .................... 710/200 |
| 5,924,121 A | 7/1999 | Arimilli et al. | |
| 6,925,515 B2 * | 8/2005 | Burns et al. ................... 710/200 |
| 7,093,093 B2 | 8/2006 | Klein | |
| 7,127,668 B2 | 10/2006 | McBryde et al. | |
| 7,234,126 B2 | 6/2007 | Catthoor et al. | |
| 7,392,352 B2 | 6/2008 | Mithal et al. | |
| 7,398,356 B2 | 7/2008 | Tran et al. | |
| 8,099,557 B2 * | 1/2012 | McCalpin et al. ............ 711/130 |
| 2004/0153609 A1 * | 8/2004 | Melamed et al. ............ 711/141 |
| 2005/0144397 A1 * | 6/2005 | Rudd et al. .................... 711/144 |
| 2006/0053143 A1 * | 3/2006 | Liu et al. ....................... 707/102 |

(Continued)

OTHER PUBLICATIONS

Bennet, et al., "Adaptive Software Cache Management for Distributed Shared Memory Architectures", retrieved at <<http://ieeexplore.ieee.org/iel4/289/3676/00134515.pdf>>, 17th Annual International Symposium on Computer Architecture 1990, Proceedings, May 28-31, 1990, pp. 125-134.

(Continued)

*Primary Examiner* — Aimee Li
*Assistant Examiner* — Craig Goldschmidt
(74) *Attorney, Agent, or Firm* — Kevin Sullivan; Raghu Chinagudabha; Micky Minhas

(57) ABSTRACT

A method to exchange data in a shared memory system includes the use of a buffer in communication with a producer processor and a consumer processor. The cache data is temporarily stored in the buffer. The method includes for the consumer and the producer to indicate intent to acquire ownership of the buffer. In response to the indication of intent, the producer, consumer, buffer are prepared for the access. If the consumer intends to acquire the buffer, the producer places the cache data into the buffer. If the producer intends to acquire the buffer, the consumer removes the cache data from the buffer. The access to the buffer, however, is delayed until the producer, consumer, and the buffer are prepared.

18 Claims, 3 Drawing Sheets

(56) References Cited

U.S. PATENT DOCUMENTS

2007/0088915 A1    4/2007    Archambault et al.
2009/0216950 A1*  8/2009    McCalpin et al. ............ 711/122

OTHER PUBLICATIONS

Bennet, et al., "Munin Distributed Shared Memory based on Type-Specific Memory Coherence", retrieved at <<http://infoscience.epfl.ch/record/55795/files/ppopp90.ps.pdf>>, 1990, pp. 1-9.

* cited by examiner

MANAGEMENT OF OWNERSHIP CONTROL AND DATA MOVEMENT IN SHARED-MEMORY SYSTEMS

BACKGROUND

Concurrent programming for shared-memory multiprocessors can include the ability for multiple threads, which can execute on multiple processors, multiple processor cores, or other classes of parallelism, to access shared variables. The shared-memory model is a commonly used method of inter-thread communication. A major issue in the use of a shared-memory model is controlling access to shared state. Without control over access to shared state, undesirable conditions such as races can occur.

Locks are a common solution to the problem of controlling concurrent access to shared state. A lock operates by serializing modifications to shared state and thus ensures that at most one thread is modifying a given piece of state at any time. This serialization can be used to preserve consistent views of the system state across cooperating threads.

A common implementation of a shared-memory model is a cache based shared memory system, which includes at least two processors each connected to a shared memory through a cache corresponding with the processor. In order for a processor to inspect a lock on a variable in the shared memory, that variable is moved to the inspecting processor according to a cache coherence protocol used in the hardware. The hardware typically uses a greedy algorithm to determine when the variable should be moved. Upon a "memory load request" instruction, the greedy algorithm will move the variable from its current processor and give the data to the processor issuing the memory load request. The greedy algorithm moves the data regardless of whether the original processor is still using the data.

Significant performance loss occurs in such cache based shared memory systems due to inefficient movement of data between processors. There is latency in propagating state change information through the system following a release operation, and there is latency to move the buffer following an acquire operation. These latencies are present for both consumer and producer operations. Accordingly, there remain opportunities for improvement in management of ownership control and data movement in shared-memory systems.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

The disclosure includes a method to exchange cache data in a shared memory system, which has a buffer in communication with a producer processor and a consumer processor. The cache data is temporarily stored in the buffer. The method includes for the consumer and the producer to indicate intent to acquire access to the buffer. In response to the indication of intent, the producer, consumer, buffer are prepared for the access. If the consumer intends to acquire the buffer, the producer places the cache data into the buffer. If the producer intends to acquire the buffer, the consumer removes the cache data from the buffer. The access to the buffer, however, is delayed until the producer, consumer, and the buffer are prepared, which is distinguishable from the method of the greedy algorithm.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated, as they become better understood by reference to the following detailed description. The elements of the drawings are not necessarily to scale relative to each other. Like reference numerals and other indicators (collectively alpha-numerics in this disclosure) designate corresponding similar features.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims. It is also to be understood that features of the various exemplary embodiments described herein may be combined with each other, unless specifically noted otherwise.

Figure 1:
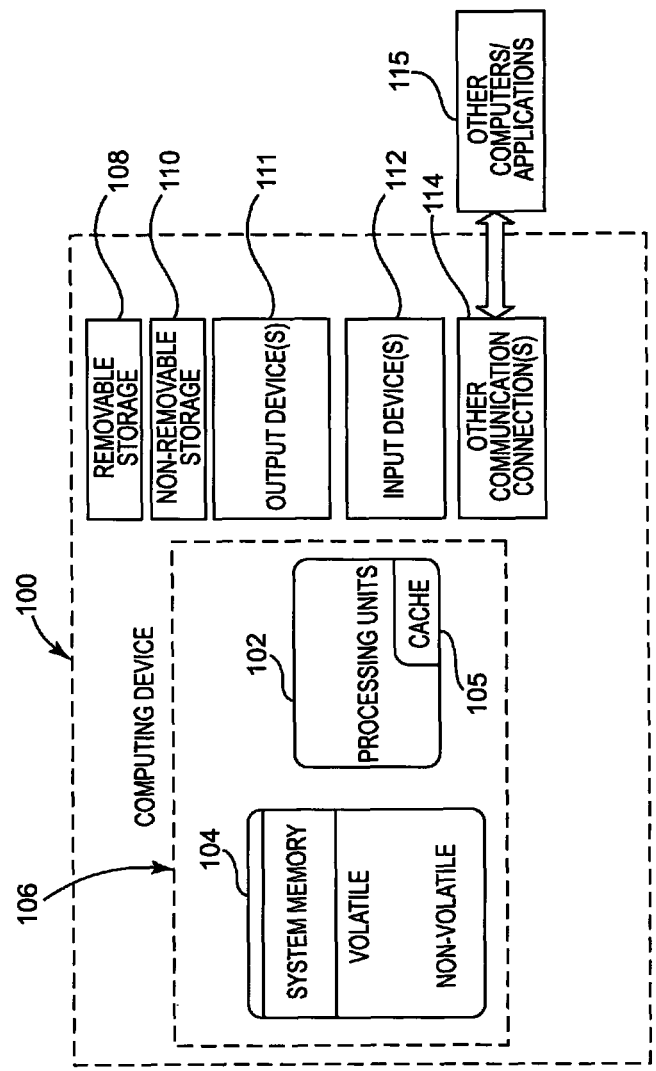
FIG. 1 is a block diagram illustrating one of many possible examples of computing devices implementing the features of the present disclosure.

FIG. 1 illustrates an exemplary computer system that can be employed as an operating environment includes a computing device, such as computing device 100. In a basic configuration, computing device 100 typically includes a processor architecture having at least two processing units, i.e., processors 102, and memory 104. Depending on the exact configuration and type of computing device, memory 104 may be volatile (such as random access memory (RAM)), non-volatile (such as read only memory (ROM), flash memory, etc.), or some combination of the two. Each of the processing units include a cache 105 interposed between the processor 102 and the memory 104. This basic configuration is illustrated in FIG. 1 by line 106. The computing device can take one or more of several forms. Such forms include a person computer, a server, a handheld device, a consumer electronic device (such as a video game console), or other.

Computing device 100 can also have additional features/ functionality. For example, computing device 100 may also include additional storage (removable and/or non-removable) including, but not limited to, magnetic or optical disks or solid state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other medium that can be used to store the desired information and that can be accessed by computing device 100. Any such computer storage media may be part of computing device 100.

Computing device 100 includes one or more communication connections 114 that allow computing device 100 to communicate with other computers/applications 115. Computing device 100 may also include input device(s) 112, such as keyboard, pointing device (e.g., mouse), pen, voice input device, touch input device, etc. Computing device 100 may also include output device(s) 111, such as a display, speakers, printer, etc.

The computing device 100 can be configured to run an operating system software program and one or more software applications, which make up a system platform. In one example, the computing device 100 includes a software component referred to as a managed environment. The managed environment can be included as part of the operating system or can be included later as a software download. The managed environment typically includes pre-coded solutions to common programming problems to aid software developers to create software programs such as applications to run in the managed environment, and it also typically includes a virtual machine that allows the software applications to run in the managed environment so that the programmers need not consider the capabilities of the specific processors 102. A managed environment can include cache coherency protocols and cache management algorithms.

A cache based shared memory system can operate in a producer-consumer idiom. The processor using the data is referred to as the producer while the processor seeking to acquire the data is referred to as the consumer. Information moved between the producer and the consumer includes the data as well as control information. A buffer is used to convey the data between the producer and the consumer. Additionally, the control information is used to provide mutual exclusion of the buffered data and to provide the state of the buffer.

The following table describes the stages of a typical producer-consumer idiom:

| Producer | Consumer |
| --- | --- |
| 1. Acquire lock | 1. Loop to acquire lock |
| 2. Fill buffer | 2. Acquire lock |
| 3. Release lock | 3. Empty buffer |
| 4. Loop to acquire lock | 4. Release lock |

In one example, movements of control information as cache line transfers can be described with reference to the table. The producers and consumers use transfers to examine the buffer state by pulling the state to the computational site. In this example, no less than six cache line transfers are used to process a single buffer of data in typical cache coherence policies and greedy producer-consumer behavior. For instance, a cache line transfer is made from the consumer to the producer to the acquire lock at stage 1. From there, a transfer is made to the consumer to the loop to acquire lock at stage 1. A transfer is made to the producer to release the lock at stage 3, and then a transfer is made back to the consumer to acquire the lock at stage 2. A cache line transfer is made back to the producer to the loop to acquire the lock at stage 4, and then a transfer is made to the consumer to release the lock at stage 4.

Figure 2:
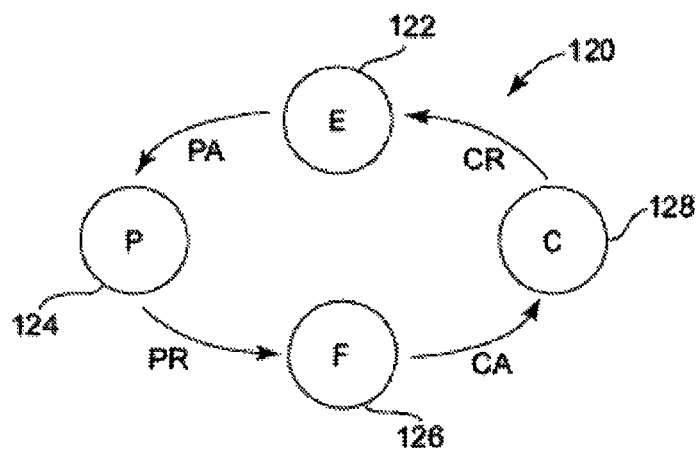
FIG. 2 is a schematic diagram illustrating an example state machine implementing features of the present disclosure.

FIG. 2 illustrates an example state machine 120 that can be embedded into a lock in a producer-consumer model. The state machine 120 encodes whether data is owned by the producer or the consumer to help decide whether to respond to a request for the data. In previous systems as described above, the data was sent to the processor 102 upon its request. In an example of the present disclosure, the request is not necessarily always sent when requested. Instead, the request is an intent to use the data, and then the data is prepared and sent when it is ready.

The state machine 120 includes an empty state (E) 122, a produce state (P) 124, a full state (F) 126, and a consume state (C) 128. In this context, a full buffer need not necessarily mean that the hardware has reached its capacity but that the buffer includes generally the whole amount of requested data. In one example, the buffer (not shown) between the processors 102 begins at the empty state 122. The producer acquires access to the buffer (PA) and begins to fill it at (P) 124. The producer releases (PR) access to the buffer when it is full at (F) 126. The consumer observes the full state (F) 126 and acquires access, or control, of the buffer (CA). The consumer begins to empty the buffer at (C) 128. The consumer releases (CR) access to the buffer when it is empty so the producer can reuse the buffer at (E) 122.

Significant reduction of overhead can be accomplished by identifying the producers and the consumers and the corresponding acquire and release operations. In this context, the intent of the producers and consumers is exposed so that data and control movement can be coordinated. By exposing intent, a hardware-software interface can be constructed that allows higher level semantics for the management of cache control and data movement than in typical systems. In this higher level, instructions can provide for an acquire request, which provides the intent of the requestor more so than a simple memory load request described above. Rather than respond automatically to a load request from the consumer, the request is delayed until producer can determine that the data is and processors are prepared for transfer, which allows for the system to perform more intelligent determinations and reduce overhead.

In one example, the instruction set architecture (ISA) can include a set of extensions for the acquire and release operations based on the state of synchronization variables. The synchronization variables can be defined in the extensions as "syncvar *". For instance, several basic ISA extensions can include:

producer_acquire(syncvar *, timeout)
producer_release(syncvar *)
consumer_acquire(syncvar *, SHARE|CONSUME, timeout)
consumer_release(syncvar *)

In this example set, the producer side includes two extensions. The producer_acquire(syncvar *, timeout) extension applies a producer-acquire (PA) input to the state machine

120 represented by the named syncvar. The system hardware suspends execution until the acquire operation is acknowledged or an expiration of a selected amount of time, i.e., a timeout, occurs. The producer_release(syncvar *) extension applies a producer-release (PR) represented by the named syncvar.

The consumer side in this example set also includes two extensions. The consumer_acquire(syncvar *, SHARE|CONSUME, timeout) extension applies a consumer-acquire (CA) input to the state machine 120. SHARE indicates the buffer can be read multiple times, such as allowing the consumer state (C) 128 returns to the full state (F) 126. CONSUME indicates a read, i.e., release, of the buffer causes the contents of the buffer to empty. The consumer state (C) 128 transitions to the empty state (E) 122. The system hardware suspends execution until the acquire is acknowledged or the timeout occurs. SHARE/CONSUME is indicated at acquire time to allow an implementation to have hardware support for multiple waiting consumers. The consumer release(syncvar *) extension applies a consumer-release (CR) input to the state machine.

Figure 3:
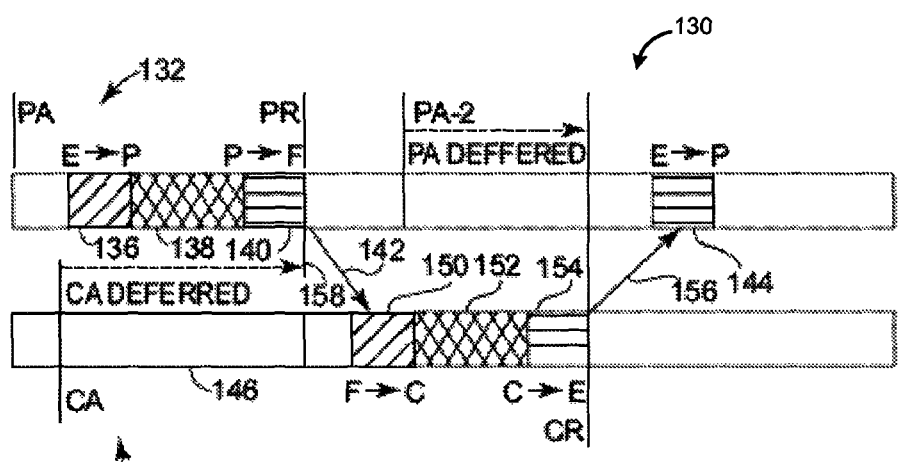
FIG. 3 is a timing diagram illustrating an example application of a first set of producer-consumer intent in the state machine of FIG. 2.

FIG. 3 graphically illustrates cache control and data movement between the producer and consumer during the operation of the state machine 120. FIG. 3 presents coordinated timelines 130 corresponding to the producer 132 and the consumer 134. Slanted line regions of the timelines 130 represent transfers of control information. Cross-hatched regions of the timelines 130 represent data transfers. Unmarked regions of the timelines 130 represent idle time overheads. Arrows between the timelines 132 and 134 represent cache line transfers between the producer and the consumer.

The producer timeline 132 begins with a producer-acquire (PA) input, and a small latency until the empty state (E). The empty state (E) changes to the produce state (P) at 136. The buffer is filled at 138, and the produce state (P) changes to the full state (F) at 140 until a time when a producer-release (PR) is provided. Then, a cache line transfer 142 occurs from the producer to the consumer. The producer timeline waits for another producer acquire (PA-2) input to perform an empty (E) to produce (P) state at 144.

The consumer timeline 134 begins as idle at 146 until a consumer-acquire (CA) input. In the example shown, the consumer-acquire (CA) operation is deferred at 148 until the producer-release (PR) operation and the cache line transfer 142 completes. The full state (F) changes to the consume state (C) at 150. The buffer is emptied at 152, and the consume state (C) changes to the empty state (E) at 154. A cache line transfer 156 occurs from the consumer to the producer upon the next producer acquire (PA-2) input.

FIG. 3 provides an example where exposure of software intent through the use of explicit operations allows underlying hardware implementations to improve performance. The timelines 130 show the effect of early acquires, and that the delivery of acquire operations—such as producer acquires (PA, PA-2) and consumer acquires (CA)—can be deferred until after the release operations to optimize cache line movement. For instance, the consumer-acquire (CA) can be issued prior to the producer-release (PR) of the buffer. If the consumer acquire (CA) is deferred until the buffer state becomes full (F) as indicated at 158, the consumer acquire (CA) communication time, manifested as a latency, is hidden. Further, if the buffer state is collocated with the buffer data then the entire time to propagate the produce (P) to full (F) state change at 140 can be eliminated when there is sufficiently early consumer acquire (CA) availability. The buffer transfer can be delayed to begin at the time the producer release (PR) is signaled after the producer is ready to transfer data to the consumer. A similar advantage can be obtained by deferring an early producer acquire such as (PA-2). Additionally, the acquire operations for both the producer and consumer can be used to cause the issuing hardware context to suspend execution until the operation completes or a timeout occurs. Return codes can be tested to determine completion status.

In contrast to the early acquires described above, situations can occur where the consumer-acquire (CA) operation is delayed until after the produce (P) to full (F) state change. In these situations, increased performance is obtained by hiding the time required to transfer the buffer to the consumer. In one example, this is accomplished through the use of additional ISA extensions that can be described as "pre-fetch extensions." Pre-fetch instructions allow the producer-consumer allows the hardware to proactively push the released buffer to the site of the consumer prior to the consumer issuing a consumer acquire (CA) instruction. A similar mechanism or extension can be used to hide buffer transfers to the producer. For example, basic pre-fetch ISA extensions can include:

```
producer_prefetch(syncvar *)
consumer_prefetch(syncvar *, SHARE|CONSUME)
```

In this example, the producer_prefetch(syncvar *) extension indicates the intent of the producer to use the buffer. The extension also queues a request for a buffer transfer operation, once the buffer enters the empty state (E) without suspending execution of the hardware context.

Also, the consumer_prefetch(syncvar *, SHARE|CONSUME) extension indicates the intent of the consumer to use the buffer. The extension also queues a request for a buffer transfer operation with other requests from other consumer processors in the shared memory system. Once the buffer enters the full state (F), the queue of consumer processors can acquire access to the data without suspending execution of the hardware context.

Figure 4:
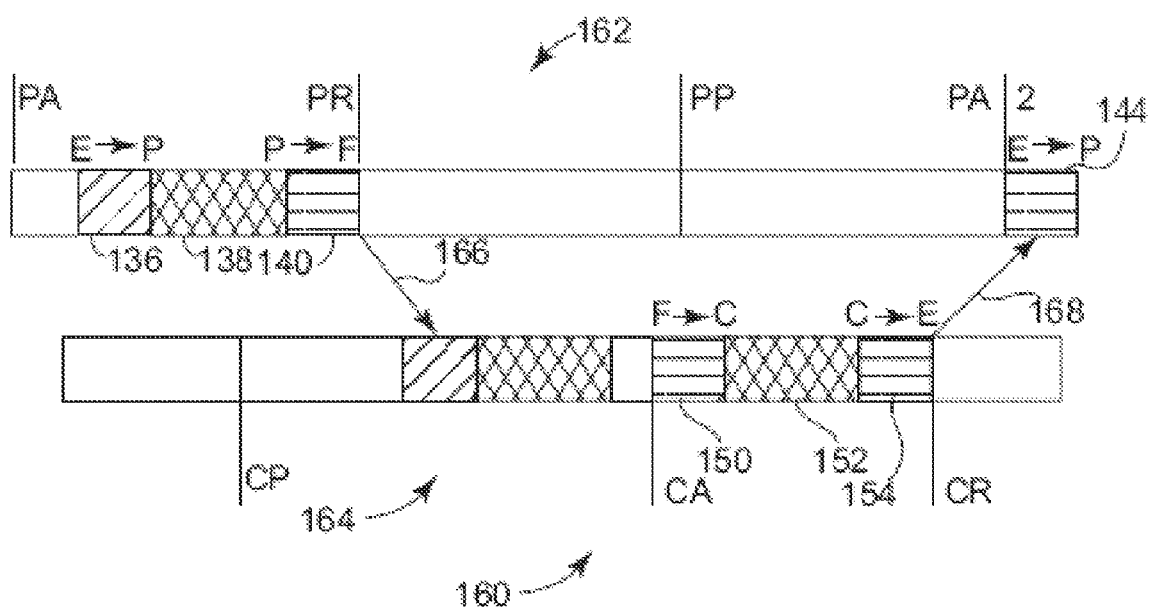
FIG. 4 is a timing diagram illustrating an example application of a second set of producer-consumer intent in the state machine of FIG. 2.

FIG. 4 graphically illustrates cache control and data movement between the producer and consumer during pre-fetch operations on the state machine 120. FIG. 4 presents coordinated timelines 160 corresponding to the producer 162 and the consumer 164. The graph legend is similar to that of FIG. 3. Slanted line regions of the timelines 160 represent transfers of control information. Cross-hatched regions of the timelines 160 represent data transfers. Unmarked regions of the timelines 160 represent idle time overheads. Arrows between the timelines 162 and 164 represent cache line transfers between the producer and the consumer.

Like features between FIGS. 3 and 4 are designated by like reference alpha-numerics.

The producer timeline 162 begins with a producer-acquire (PA) input, and a small latency until the empty state (E). The empty state (E) changes to the produce state (P) at 136. The buffer is filled at 138, and the produce state (P) changes to the full state (F) at 140 until a time when a producer-release (PR) is provided.

A consumer-acquire (CA) instruction is input after the produce (P) to full (F) state change at 140. Instead, the consumer pre-fetch (CP) instruction occurs, which indicates intent of the consumer to use the buffer. After the produce-release (PF) is provided on the producer timeline 162, a cache line transfer 166 occurs from the producer to the consumer. During the time from the consumer pre-fetch (CP) to the consumer acquire (CA) the hardware will proactively push the released buffer to the consumer.

Similarly, a producer pre-fetch (PP) instruction can be input prior to the consumer release (CR) is provided to the consumer timeline 164. The producer prepares itself to perform the empty (E) to produce (P) state change at 144 upon another producer-acquire (PA-2) instruction. A cache line transfer occurs from the consumer to the producer 168 upon the consumer release (CR).

The synchronization variables, or "syncvars" as used in the ISA extensions, are a native hardware data type. In the producer-consumer idiom, a syncvar is used to maintain the state of the buffer. The syncvar also provides a rendezvous point for the producer and the consumer.

Figure 5:
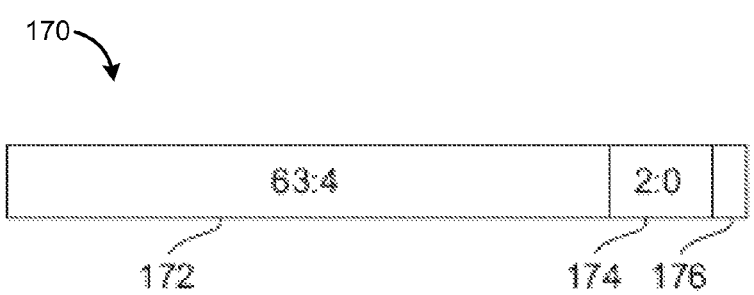
FIG. 5 is a schematic diagram illustrating a hardware data type configured for use in the state machine of FIG. 2.

FIG. 5 illustrates an example format of a syncvar 170. The syncvar 170 includes a user defined field 172, a state field 174, and a lock field 176. In the example shown, the user defined field includes 60 bits or bits 63:4, the state field 174 includes 3 bits or bits 2:0, and the lock field 176 is a lock bit.

The user-defined field 172 can be typically used to link with additional data structures. The state field 174 are implicitly modified by the acquire and release ISA extensions. The pre-fetch instructions do not alter the architectural state. The lock field 176 provides hardware support for exclusive access to the syncvar. Instructions such as "store" and other instructions can set and clear the lock bit. When the lock bit is set, all instructions in the producer-consumer ISA extensions will return a status indicating the operation failed because the lock bit is set.

The user defined field 172 can be used to address several exceptional conditions in the state machine 120. These exceptional conditions can include illegal operations, locked syncvars, and others exceptional situations. In the case of an exceptional condition, an error code can be returned so that the software can take an appropriate action. The user defined field 172 can be applied to build data structures specific to an individual buffer and the syncvar lock field 176 can be used to maintain constant the syncvar state while an exception handler runs.

Error codes exist that can be returned for acquire operations in an ISA implementation based on the ubiquitous x86 architecture. For example, the error code ZF can include a 1 when the acquire is completed with an exceptional condition and a 0 when the acquire is completed without exception. Additionally, the error codes CF, OF, PF, SF can be used for a timeout, locked syncvar, spurious syncvar, illegal operation, or others.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method to exchange cache data and control information between processors in a cache based shared memory system, the cache based shared memory system having a plurality of processors including at least a producer and a consumer operating in a producer-consumer idiom, wherein the producer and the consumer are each in communication with a buffer configured to temporarily store the cache data and control information while conveying the cache data and control information between the producer and the consumer, the method comprising:

employing the control information to provide mutual exclusion of the cache data temporarily stored in the buffer and provide a state of the buffer;

indicating an intent of one of the consumer and the producer to acquire access to the buffer;

preparing the producer, the consumer, and the buffer for the one of the consumer and the producer to acquire ownership of the buffer in response to the indicated intent;

delaying the acquisition of ownership of the buffer until after the producer, the consumer, and the buffer are prepared for the acquisition of ownership of the buffer;

in early acquire situations, the indicating an intent of one of the consumer and the producer is preformed by sending an acquire instruction to the other of one of the consumer and the producer, and the delaying includes deferring ownership of the buffer until the other of the producer and the consumer has released ownership of the buffer; and in late acquire situations where the acquire occurs after the other of the producer and the consumer has released ownership of the buffer, an indicating an intent of one of the consumer and the producer to use the buffer is preformed by sending a prefetch instruction to the other of the consumer and the producer, and the delaying includes proactively pushing the released buffer to the one of the consumer and the producer prior to the acquire.

2. The method of claim 1 wherein the indicating includes selecting a synchronization variable.

3. The method of claim 2 wherein the indicating includes selecting expiration of time.

4. The method of claim 2 wherein the indicating includes acknowledging the indicating by the other of the producer and the consumer.

5. The method of claim 1 wherein acquiring ownership of the buffer includes controlling the buffer.

6. The method of claim 1 wherein the preparing includes the other of the producer and the consumer releasing access to the buffer.

7. The method of claim 6 wherein preparing includes filling the buffer with the shared data in response to the consumer indicating intent to acquire the ownership of the buffer.

8. The method of claim 6 where the preparing includes emptying the shared data from the buffer.

9. The method of claim 1 wherein in early acquire situations, the delaying includes deferring ownership of the buffer until the other of the producer and the consumer has released ownership of the buffer and a cache line transfer from the one of the consumer and the producer to the other of the producer and the consumer completes.

10. The method of claim 1 wherein in late acquire situations, operation of the prefetch instruction includes queuing the one of the producer and the consumer to acquire ownership of the buffer.

11. A computer-readable storage medium, which is not a transitory propagating signal, storing computer-executable instructions for controlling a state machine operating in a producer-consumer idiom through an empty state, a produce state, a full state, and a consume state in sequence wherein the state machine is for a buffer configured to temporarily store cache data and control information while transferring the cache data and control information between a producer processor and a consumer processor in a cache based shared memory system employing the control information to provide mutual exclusion of the cache data temporarily stored in the buffer and provide a state of the buffer, the computer-executable instructions comprising:

a producer acquire instruction indicating an intent of the producer processor to acquire ownership of the buffer, wherein ownership of the buffer by the producer processor is delayed until after the empty state;

a producer release instruction to indicate the producer has filled the buffer with the cache data during the produce state preceding transition to the full state and is now relinquishing ownership of the buffer;

a producer prefetch instruction to indicate the producer to use buffer;

a consumer acquire instruction indicating an intent of the consumer processor to acquire ownership of the buffer, wherein ownership of the buffer by the consumer processor is delayed to until after the full state;

a consumer release instruction to indicate the consumer processor has emptied the cache data from the buffer during the consume state preceding transition to the empty state and is now relinquishing ownership of the buffer; and a consumer prefetch instruction indicating an intent of the consumer to use buffer, in early producer acquire instruction situations, indicating an intent the producer processor to acquire ownership of the buffer via the producer acquire instruction, and deferring ownership of the buffer until after the consumer release instruction is issued, in late producer acquire instruction situations where the producer acquire instruction occurs after the consumer release instruction, indicating an intent of the producer processor to use the buffer via the producer prefetch instruction, and proactively controlling pushing the released buffer to the producer processor prior to the producer acquire instruction issuing, in early consumer acquire instruction situations, indicating an intent of the consumer processor to acquire ownership of the buffer via the consumer acquire instruction, and deferring ownership of the buffer until after the producer release instruction is issued, and in late consumer acquire instruction situations where the consumer acquire instruction occurs after the producer release instruction, indicating an intent the consumer processor to use the buffer via the producer prefetch instruction, and proactively controlling pushing the released buffer to the consumer processor prior to the consumer acquire instruction issuing.

12. The computer-readable storage medium of claim 11 wherein the computer executable instructions relate to a synchronization variable of the shared memory system.

13. The computer-readable storage medium of claim 12 wherein the synchronization variable includes a sixty bit user defined field, a three bit state field, and a one bit lock field.

14. The computer-readable storage medium of claim 12 wherein the producer acquire instruction and the consumer acquire instruction each include a selected expiration of time.

15. The computer-readable storage medium of claim 11 wherein the consumer processor exclusively acquires ownership of the buffer.

16. The computer-readable storage medium of claim 11 wherein the producer prefetch and consumer prefetch instructions queue a request for a buffer transfer operation.

17. A system to manage cache control and cache data movement between a producer processor and a consumer processor in a cache based shared-memory multiprocessor device, the system comprising:

a buffer in communication with the producer processor and the consumer processor and configured to temporarily store cache data and control information while moving the cache data and control information from the producer processor to the consumer processor, the control information employed to provide mutual exclusion of the cache data temporarily stored in the buffer and provide a state of the buffer; and a state machine for the buffer transitioning through an empty state, a produce state, a full state, and a consume state operating in a producer-consumer idiom; wherein the state machine is configured to:

acquire the buffer for the producer processor after the empty state, transfer control of the buffer to the consumer processor at the full state after the producer processor has filled the buffer in the produce state, and release the buffer to the producer processor after the consume state, in early producer acquire situations, respond to a producer instruction indicating an intent of the producer to acquire access to the buffer to defer ownership of the buffer until the consumer processor has released ownership of the buffer, and in late producer acquire situations where the producer acquire occurs after the consumer processor has released ownership of the buffer, respond to a producer instruction indicating an intent of the producer to use the buffer to proactively control pushing the released buffer to the producer processor prior to the producer acquire.

18. The system of claim 17 wherein the state machine controls movement of the control information as cache line transfers between the producer processor and the consumer processor.

* * * * *